United States Patent
Jang et al.

(10) Patent No.: US 10,088,707 B2
(45) Date of Patent: Oct. 2, 2018

(54) CURVED LIQUID CRYSTAL DISPLAY AND METHOD OF MANUFACTURING THE SAME

(71) Applicant: SAMSUNG DISPLAY CO., LTD., Yongin, Gyeonggi-do (KR)

(72) Inventors: Jae Soo Jang, Suwon-si (KR); Se Hyun Lee, Seoul (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 221 days.

(21) Appl. No.: 15/095,255

(22) Filed: Apr. 11, 2016

(65) Prior Publication Data
US 2017/0045784 A1     Feb. 16, 2017

(30) Foreign Application Priority Data
Aug. 11, 2015 (KR) .......................... 10-2015-0112910

(51) Int. Cl.
G02F 1/1337 (2006.01)
(52) U.S. Cl.
CPC .. G02F 1/133711 (2013.01); G02F 1/133788 (2013.01); *G02F 2001/133726* (2013.01); *G02F 2001/133742* (2013.01)
(58) Field of Classification Search
CPC .................. G02F 1/133711; G02F 1/133788
USPC ............................................................ 349/123
See application file for complete search history.

(56) References Cited

U.S. PATENT DOCUMENTS

| 4,804,254 A * | 2/1989 | Doll .................... G02F 1/13392 |
| | | 349/155 |
| 5,808,716 A * | 9/1998 | Gass ................. G02F 1/133711 |
| | | 349/124 |
| 2011/0032464 A1* | 2/2011 | Shin .................. G02F 1/133753 |
| | | 349/123 |
| 2013/0148065 A1* | 6/2013 | Peng ................. G02F 1/134309 |
| | | 349/123 |

FOREIGN PATENT DOCUMENTS

| KR | 1020100071141 A | 6/2010 |
| KR | 1020120012371 A | 2/2012 |
| KR | 1020150047399 A | 5/2015 |

* cited by examiner

*Primary Examiner* — Lucy Chien
(74) *Attorney, Agent, or Firm* — Cantor Colburn LLP

(57) ABSTRACT

A curved liquid crystal display includes an upper curved substrate; a lower curved substrate; a liquid crystal layer including liquid crystal molecules having negative dielectric anisotropy and between the upper and lower curved substrates; an upper curved liquid crystal alignment layer between the liquid crystal layer and the upper curved substrate; a lower curved liquid crystal alignment layer between the liquid crystal layer and the lower curved substrate. In a first region, a content of a reactive mesogen polymer per unit area of the lower curved liquid crystal alignment layer is higher that of the upper curved liquid crystal alignment layer, and in a second region, the content of the reactive mesogen polymer per unit area of the upper curved liquid crystal alignment layer is higher than that of the lower curved liquid crystal alignment layer.

18 Claims, 24 Drawing Sheets

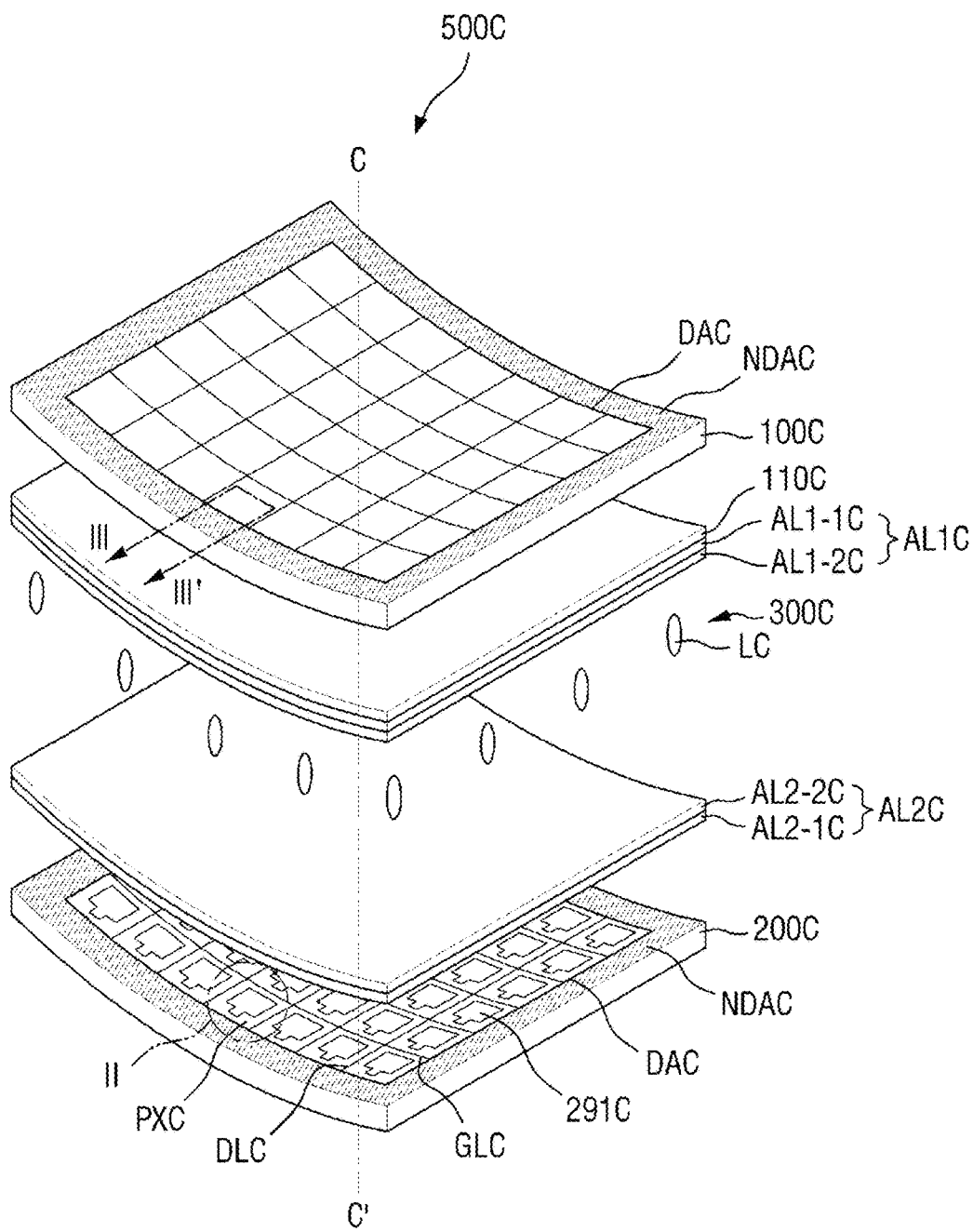

CURVED LIQUID CRYSTAL DISPLAY AND METHOD OF MANUFACTURING THE SAME

This application claims priority to Korean Patent Application No. 10-2015-0112910, filed on Aug. 11, 2015, and all the benefits accruing therefrom under 35 U.S.C. § 119, the content of which in its entirety is herein incorporated by reference.

BACKGROUND

1. Field

The invention relates to a curved liquid crystal display ("LCD") and a method of manufacturing the LCD.

2. Description of the Related Art

A liquid crystal display ("LCD"), which is one of the most widely-used types of flat panel display, typically includes two substrates, on which field-generating electrodes such as pixel electrodes and a common electrode are disposed, and a liquid crystal layer which is interposed between the two substrates.

The LCD generates an electric field by applying a voltage to the field-generating electrodes and thereby determines the alignment direction of liquid crystal molecules in the liquid crystal layer. The LCD displays an image by controlling the polarization of light incident thereupon.

Recently, the screen size of LCDs has increased since an increasing number of LCDs were employed as the displays of television ("TV") sets. However, as the size of an LCD increases, an image viewed at a front of the LCD may substantially differ from an image viewed on sides of the LCD.

To compensate such a front-side visibility difference, an LCD may be bent into a curved shape such as a concave or convex shape. A curved LCD may be classified into a portrait type having a longer vertical length than the horizontal length thereof and bent in a vertical direction or a landscape type having a shorter vertical length than the horizontal length thereof and bent in a horizontal direction.

SUMMARY

Exemplary embodiments of the invention relate to a curved liquid crystal display ("LCD") with improved optical transmittance.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a curved liquid crystal display ("LCD"), includes an upper curved substrate; a lower curved substrate disposed opposite to the upper curved substrate; a liquid crystal layer disposed between the upper and lower curved substrates, where the liquid crystal layer includes liquid crystal molecules having negative dielectric anisotropy; an upper curved liquid crystal alignment layer disposed between the liquid crystal layer and the upper curved substrate; and a lower curved liquid crystal alignment layer disposed between the liquid crystal layer and the lower curved substrate. In such an embodiment, a content of a reactive mesogen polymer per unit area of the lower curved liquid crystal alignment layer in a first region is higher than a content of the reactive mesogen polymer per unit area of the upper curved liquid crystal alignment layer in the first region, and the content of the reactive mesogen polymer per unit area of the upper curved liquid crystal alignment layer in a second region is higher than the content of the reactive mesogen polymer per unit area of the lower curved liquid crystal alignment layer in the second region.

According to an exemplary embodiment of the invention, a curved LCD, includes an upper curved substrate; a lower curved substrate disposed opposite to the upper curved substrate; a liquid crystal layer disposed between the upper and lower curved substrates, where the liquid crystal layer includes liquid crystal molecules having negative dielectric anisotropy; an upper curved liquid crystal alignment layer disposed between the liquid crystal layer and the upper curved substrate; and a lower curved liquid crystal alignment layer disposed between the liquid crystal layer and the lower curved substrate. In such an embodiment, a pretilt angle of first liquid crystal molecules on a surface of the lower curved liquid crystal alignment layer in a first region at an initial state is smaller than a pretilt angle of second liquid crystal molecules on a surface of the upper curved liquid crystal alignment layer in the first region at the initial state, and a pretilt angle of third liquid crystal molecules on a surface of the upper curved liquid crystal alignment layer in a second region at the initial state is smaller than a pretilt angle of fourth liquid crystal molecules on a surface of the lower curved liquid crystal alignment layer in the second region at the initial state, where the initial state is a state in which no electric field is applied to the liquid crystal molecules.

According to an exemplary embodiment of the invention, a method of manufacturing a curved LCD, includes fabricating a lower substrate, which includes a pixel electrode having slit patterns, and a counter substrate, which is opposite to the lower substrate, where the slit patterns includes a cross-shaped stem, which has a horizontal stem portion and a vertical stem portion intersecting the horizontal stem portion, minute branches branched off from the cross-shaped stem, and cutouts disposed between the minute branches; providing alignment layers by applying an alignment material including reactive mesogens on each of the lower substrate and the counter substrate; fabricating a flat liquid crystal panel by providing a liquid crystal layer between the lower substrate and the counter substrate and bonding the lower substrate and the counter substrate together; and disposing a mask over the flat liquid crystal panel to overlap the horizontal stem portion or the vertical stem portion and irradiating ultraviolet ("UV") light onto the flat liquid crystal panel through the mask while applying an electric field to the flat liquid crystal panel.

According to exemplary embodiments, a curved LCD may have improved optical transmittance.

Other features and exemplary embodiments will be apparent from the following detailed description, the drawings, and the claims.

BRIEF DESCRIPTION OF THE DRAWINGS

FIG. 1 is a schematic exploded perspective view of a curved liquid crystal display ("LCD") according to an exemplary embodiment of the invention.

DETAILED DESCRIPTION

Figure 2A:
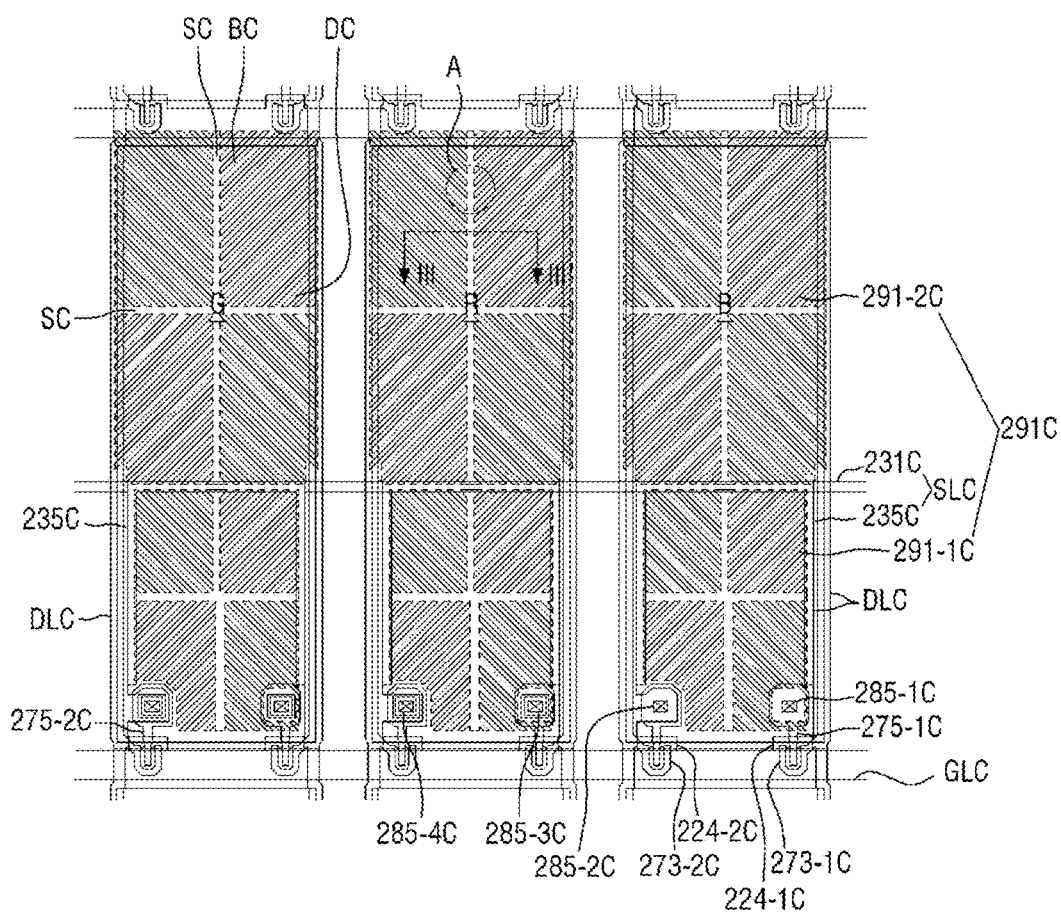
FIG. 2A is a schematic view of pixel electrodes in an area II of FIG. 1.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Although the terms "first", "second", etc. may be used herein to describe various elements, these elements should not be limited by these terms. These terms may be used to distinguish one element from another element. Thus, a first element described in this application may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

When a first element is referred to as being "on", "connected to", or "coupled to" a second element, the first element can be directly on, directly connected to, or directly coupled to the second element, or one or more intervening elements may be present. In contrast, when a first element is referred to as being "directly on", "directly connected to", or "directly coupled to" a second element, there are no intervening elements intentionally provided between the first element and the second element. Like numbers may refer to like elements in this application. The term "and/or" includes any and all combinations of one or more of the associated items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features.

The terminology used herein is for the purpose of describing particular embodiments only and is not intended to be limiting. As used herein, the singular forms "a", "an", and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-section illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described with reference to the attached accompanying drawings.

Figure 2B:
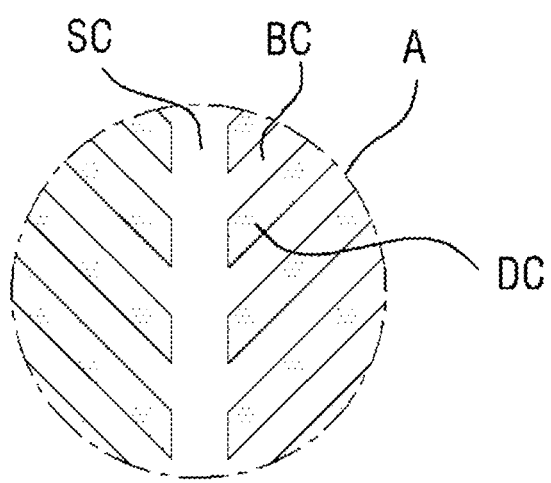
FIG. 2B is an enlarged view of the encircled portion A in FIG. 2A.

FIG. 1 is a schematic exploded perspective view of a curved liquid crystal display ("LCD") according to an exemplary embodiment of the invention. FIG. 2A is a schematic view of pixel electrodes in an area II of FIG. 1. FIG. 2B is an enlarged view of the encircled portion Referring to FIGS. 1, 2A and 2B, a curved LCD 500C includes an upper curved substrate 100C, a lower curved substrate 200C, which is spaced apart from, and faces, the upper curved substrate 100C, and a liquid crystal layer 300C, which is disposed between the upper curved substrate 100C and the lower curved substrate 200C.

Each of the upper and lower curved substrates 100C and 200C includes a display area DAC and a non-display area NDAC. The display area DAC is a region where an image is displayed, and the non-display area NDAC is a region where no image is displayed. The display area DAC may be surrounded by the non-display area NDAC.

A common electrode 110C may be disposed between the upper curved substrate 100C and the lower curved substrate 200C, and may be a "patternless" electrode with no slit patterns. Pixel electrodes 291C may be disposed between the lower curved substrate 200C and the common electrode 110C, and may be pattern electrodes with slit patterns. The slit patterns may include a cross-shaped stem SC, minute branches BC branched off from the cross-shaped stem SC, and cutouts DC, which are defined between the minute branches BC.

The liquid crystal layer 300C may be disposed between the common electrode 110C and the pixel electrodes 291C. The liquid crystal layer 300C may include liquid crystal molecules LC with negative dielectric anisotropy. An upper curved liquid crystal alignment layer AL1C may be disposed between the common electrode 110C and the liquid crystal layer 300C. The upper curved liquid crystal alignment layer AL1C may include an alignment base layer AL1-1C and an alignment stabilization layer AL1-2C. A lower curved liquid crystal alignment layer AL2C may be disposed between the liquid crystal layer 300C and the pixel electrodes 291C. The lower curved liquid crystal alignment layer AL2C may include an alignment base layer AL2-1C and an alignment stabilization layer AL2-2C.

The lower curved substrate 200C may be a thin-film transistor ("TFT") substrate. In an exemplary embodiment, a plurality of gate lines GLC, which extend in a first direction, and a plurality of data lines DLC, which extend in a second direction that is perpendicular to the first direction, may be disposed in the display area DAC of the lower curved substrate 200C. The pixel electrodes 291C may be disposed in pixels PXC, respectively, which may be defined by the gate lines GLC and the data lines DLC.

Each of the pixel electrodes 291C may include sub-pixel electrodes 291-1C and 291-2C, which are spaced from each other. In one exemplary embodiment, for example, the sub-pixel electrodes 291-1C and 291-2C may be generally rectangular, as shown in FIG. 2A. Each of the sub-pixel electrodes 291-1C and 291-2C may be pattern electrodes with slit patterns. In such an embodiment, each of the sub-pixel electrodes 291-1C and 291-2C may have slit patterns including a cross-shaped stem SC, minute branches BC extending from the cross-shaped stem SC and cutouts DC disposed between the minute branches BC. The stem SC may be in a cross shape including a horizontal stem portion and a vertical stem portion intersecting each other, and the minute branches BC may be radially or obliquely branched off from the cross-shaped stem SC at an angle of about 45° with respect to the cross-shaped stem SC. Opposing sides of each of a plurality of pairs of cutouts DC on opposite sides of the horizontal stem portion may be substantially parallel to each other in a horizontal direction. Opposing sides of each of a plurality of cutouts DC on opposite sides of the vertical stem portion may be substantially parallel to each other in a vertical direction.

Each of the gate lines GLC may include gate electrodes 224-1C and 224-2C, which are defined by protruding portions of the gate lines GLC toward the pixel electrodes 291C along the second direction. Each of the data lines DLC may include source electrodes 273-1C and 273-2C and drain electrodes 275-1C and 275-2C. The source electrodes 273-1C and 273-2C may be defined by protruding portions of the data lines DLC and may be in a U-like shape. The drain electrodes 275-1C and 275-2C may be spaced from the source electrodes 273-1C and 273-2C.

The pixel electrodes 291C may be provided with a data voltage via TFTs, which are switching elements. The gate electrodes 224-1C and 224-2C, which correspond to the control terminals of the TFTs, may be electrically connected to a corresponding one of the gate lines GLC, and the source electrodes 273-1C and 273-2C, which correspond to the input terminals of the TFTs, may be electrically connected to a corresponding one of the data lines DLC via contact holes 285-1C, 285-2C, 285-3C and 285-4C, and the drain electrodes 275-1C and 275-2C, which correspond to the output terminals of the TFTs, may be electrically connected to a corresponding one of the pixel electrodes 291C.

The pixel electrodes 291C may generate an electric field together with the common electrode 110C and may thus control the alignment direction of the liquid crystal molecules LC of the liquid crystal layer 300C, which is disposed between the common electrode 110C and the pixel electrodes 291C. The pixel electrodes 291C may distort the electric field and may thus control the alignment direction of liquid crystal molecules LC.

The TFT substrate may have a structure in which a base substrate (not illustrated) including glass or a polymer, the gate electrodes 224-1C and 224-2C, a gate insulating layer (not illustrated), a semiconductor layer (not illustrated), an ohmic contact layer (not illustrated), the source electrodes 273-1C and 273-2C, the drain electrodes 275-1C and 275-2C, a passivation layer (not illustrated) and an organic layer (not illustrated) are stacked one on another.

The channel of the TFTs may be defined by the semiconductor layer. The semiconductor layer may be disposed to overlap the gate electrodes 224-1C and 224-2C. The source electrodes 273-1C and 273-2C may be spaced from the drain electrodes 275-1C and 275-2C, respectively, with respect to the semiconductor layer.

A sustain electrode line SLC may include a stem line 231C, which extends substantially in parallel to the gate lines GLC, and a plurality of branch lines 235C, which are branched off from the cross-shaped stem line 231C. Alternatively, the sustain electrode line SLC may be omitted, and the shape and arrangement of the sustain electrode line SLC may be variously modified.

The non-display area NDAC, which is the periphery of the display area DAC, may be a light-shielding region surrounding the display area DAC. In an exemplary embodiment, one or more driving units (not illustrated) that provide a gate driving signal and a data driving signal to each of the pixels PXC in the display area DAC may be disposed in the non-display area NDAC of the lower curved substrate 200C. The gate lines GLC and the data lines DLC may extend from the display area DAC through to the non-display area NDAC, and may be connected to the driving units.

The upper curved substrate 100C may be a counter substrate of the lower curved substrate 200C. The common electrode 110C may be disposed on the lower curved substrate 200C.

A color filter layer (not illustrated) may be disposed in part of the display area DAC corresponding to each of the pixels PXC, and may include red (R), green (G) and blue (B) color filters. The color filter layer may be disposed in one of the upper and lower curved substrates 100C and 200C. In one exemplary embodiment, for example, where the color filter layer is in the upper curved substrate 100C, the upper curved substrate 100C may have a structure in which a base substrate (not illustrated) including glass or a polymer, the color filter layer and an overcoat layer (not illustrated) are stacked one on another. In such an embodiment, the overcoat layer may be a planarization layer covering the color filter layer. In such an embodiment, the common electrode 110C may be disposed on the overcoat layer.

In an alternative exemplary embodiment, where the color filter layer is disposed in the lower curved substrate 200C, the lower curved substrate 200C may have a color-filter-on-array ("COA") structure in which the color filter layer is formed on a transparent insulating substrate where the TFTs are provided. In one exemplary embodiment, for example, the color filter layer may be disposed between an organic layer and a passivation layer that covers the source electrodes 273-1C and 273-2C and the drain electrodes 275-1C and 275-2C.

A light-shielding pattern layer (not illustrated) may be disposed along the boundaries among the R, G and B color filters of the color filter layer. The light-shielding pattern layer may be disposed in one of the upper and lower curved substrates 100C and 200C. In one exemplary embodiment, for example, the light-shielding pattern layer may be a black matrix.

During the fabrication of the curved LCD 500C by bending a flat-panel LCD, a misalignment may occur between the upper and lower curved substrates 100C and 200C due to the stress applied to the upper and lower curved substrates 100C and 200C. In a curved LCD, manufacture by bending a flat-panel LCD, the upper curved substrate 100C may be shifted leftward or rightward with respect to the lower curved substrate 200C, and as a result, the state of the alignment of the upper and lower curved substrates 100C and 200C may become different from the state of the alignment of the first and second flat substrates of the flat-panel LCD. Such misalignment between the upper and lower curved substrates 100C and 200C may degrade the display quality of the curved LCD 500C.

When each of the upper and lower curved liquid crystal alignment layers AL1C and AL2C includes multiple domains that differ from each other in the alignment direction of the directors of liquid crystal molecules therein, any misalignment between the domains of the upper curved liquid crystal alignment layer AL1C and the domains of the lower curved liquid crystal alignment layer AL2C may cause interference or a conflict between first liquid crystal molecules, which are aligned at an inclination at the surface of the upper curved liquid crystal alignment layer AL1C, and second liquid crystal molecules, which are aligned at an inclination at the surface of the lower curved liquid crystal alignment layer AL2C along a different direction from the first liquid crystal molecules. As a result, the liquid crystal molecules between the first liquid crystal molecules and the second liquid crystal molecules may be vertically aligned, thereby a texture may be recognized. The texture, however, may be viewed within the display area DAC as a smudge or dark area and may lower the light transmittance of the curved LCD 500C.

Figure 3:
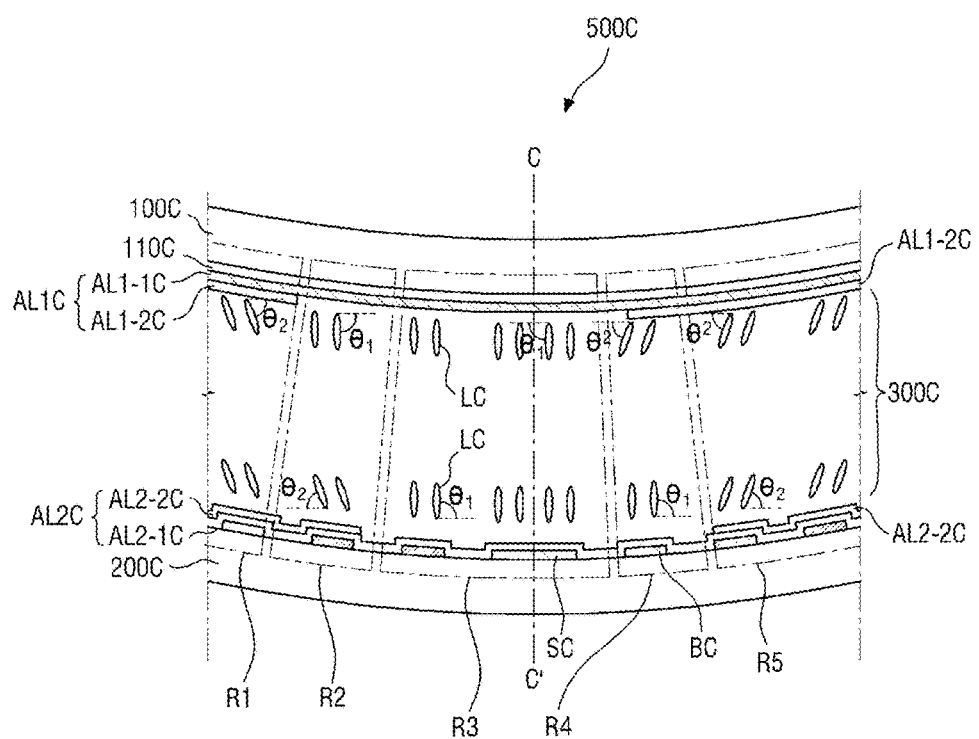
FIG. 3 is a schematic cross-sectional view taken along line III-Ill' of FIG. 1.

An exemplary embodiment of the curved LCD 500C will hereinafter be described in further detail with reference to FIG. 3. FIG. 3 is a cross-sectional view taken along line III-III' of FIG. 1. More specifically, FIG. 3 illustrates an initial state of alignment of the liquid crystal molecules LC in the curved LCD 500C when an electric field is yet to be applied.

Referring to FIG. 3, in an exemplary embodiment, the curved LCD 500C may include a first region R1, a second region R2, a third region R3, a fourth region R4, and a fifth region R5.

In the first region R1, the common electrode 110C may be disposed on the upper curved substrate 100C, the upper curved liquid crystal alignment layer AL1C may be disposed on the common electrode 110C, and the upper curved liquid crystal alignment layer AL1C may include the alignment base layer AL1-1C and the alignment stabilization layer AL1-2C. In the first region R1, the minute branches BC may be disposed on the lower curved substrate 200C, the lower curved liquid crystal alignment layer AL2C may be disposed on the minute branches BC, and the lower curved liquid crystal alignment layer AL2C may include the alignment base layer AL2-1C and the alignment stabilization layer AL2-2C.

The alignment base layer AL2-1C may include a polymer having polyimide as a main chain thereof and a vertical alignment group as a side chain thereof, and the alignment stabilization layer AL2-2C may include reactive mesogen polymer projections. The reactive mesogen polymer projections may be provided or formed on the alignment stabilization layer AL2-2C as island patterns. The reactive mesogen polymer projections may fix or stabilize a pretilt angle of the liquid crystal molecules LC in the absence of an electric field in the curved LCD 500C. Thus, in the first region R1, the liquid crystal molecules LC on the surface of, e.g., adjacent to, each of the upper and lower curved liquid crystal alignment layers AL1C and AL2C may be obliquely aligned at a predetermined pretilt angle, e.g., a second pretilt angle $\theta_2$, in the absence of an electric field in the curved LCD 500C. In one exemplary embodiment, for example, the second pretilt angle $\theta_2$ may be less than about 90°, e.g., in a range of about 88.6° to about 89.0°.

In the second region R2, the common electrode 110C may be disposed on the upper curved substrate 100C, the upper curved liquid crystal alignment layer AL1C may be disposed on the common electrode 110C, and the upper curved liquid crystal alignment layer AL1C may include the alignment base layer AL1-1C, but no alignment stabilization layer AL1-2C.

In the second region R2, the minute branches BC may be disposed on the lower curved substrate 200C, the lower curved liquid crystal alignment layer AL2C may be disposed on the minute branches BC, and the lower curved liquid crystal alignment layer AL2C may include the alignment base layer AL2-1C and the alignment stabilization layer AL2-2C.

Thus, in the second region R2, the content or average number of reactive mesogen projections per unit area of the upper curved liquid crystal alignment layer AL1C may be lower or less than the content or average number of reactive mesogen projections per unit area of the lower curved liquid crystal alignment layer AL2C. In such an embodiment, in the second region R2, the content or average number of reactive mesogen projections per unit area of the lower curved liquid crystal alignment layer AL2C may be higher or greater than the content or average number of reactive mesogen projections per unit area of the upper curved liquid crystal alignment layer AL1C.

Accordingly, in the second region R2, in the absence of an electric field in the curved LCD 500C, the liquid crystal molecules LC on the surface of the upper curved liquid crystal alignment layer AL1C may be aligned at a predetermined pretilt angle, e.g., a first pretilt angle $\theta_1$, and the liquid crystal molecules LC on the surface of the lower curved liquid crystal alignment layer AL2C may be aligned at the second pretilt angle $\theta_2$. In the absence of an electric field in the curved LCD 500C, the liquid crystal molecules LC on the surface of the upper curved liquid crystal alignment layer AL1C are substantially vertically aligned, compared to the liquid crystal molecules on the surface of the lower curved liquid crystal alignment layer AL2C. Thus, the pretilt angle $\theta_1$ may be larger than the second pretilt angle $\theta_2$. In one exemplary embodiment, for example, the pretilt angle (e.g., the first pretilt angle $\theta_1$) of the liquid crystal molecules LC on the surface of the upper curved liquid crystal alignment layer AL1C may be about 90°, and the pretilt angle (e.g., the second pretilt angle $\theta_2$) of the liquid crystal molecules LC on the surface of the lower curved liquid crystal alignment layer AL2C may be less than about 90°, e.g., in a range of about 88.6° to about 89.0°.

In the third region R3, the common electrode 110C may be disposed on the upper curved substrate 100C, the upper curved liquid crystal alignment layer AL1C may be disposed on the common electrode 110C, and the upper curved liquid crystal alignment layer AL1C may include the alignment base layer AL1-1C, but no alignment stabilization layer AL1-2C.

In the third region R3, the minute branches BC and the cross-shaped stem SC may be disposed on the lower curved substrate 200C, the lower curved liquid crystal alignment layer AL2C may be disposed on the minute branches BC and the cross-shaped stem SC, and the lower curved liquid crystal alignment layer AL2C may include the alignment base layer AL2-1C, but no alignment stabilization layer AL2-2C.

Thus, in the third region R3, in the absence of an electric field in the curved LCD 500C, the liquid crystal molecules LC on the surface of the upper curved liquid crystal alignment layer AL1C may be aligned at the first pretilt angle $\theta_1$, and the liquid crystal molecules LC on the surface of the lower curved liquid crystal alignment layer AL2C may also be aligned at the pretilt angle $\theta_1$. In one exemplary embodiment, for example, the first pretilt angle $\theta_1$ may be about 90°. In such an embodiment, in the absence of an electric field in the curved LCD 500C, the liquid crystal molecules LC on the surface of the upper curved liquid crystal alignment layer AL1C and the liquid crystal molecules LC on the surface of the lower curved liquid crystal alignment layer AL2C may both be substantially vertically aligned.

In the fourth region R4, the common electrode 110C may be disposed on the upper curved substrate 100C, the upper curved liquid crystal alignment layer AL1C may be disposed on the common electrode 110C, and the upper curved liquid crystal alignment layer AL1C may include the alignment base layer AL1-1C and the alignment stabilization layer AL1-2C.

In the fourth region R4, the minute branches BC may be disposed on the lower curved substrate 200C, the lower curved liquid crystal alignment layer AL2C may be disposed on the minute branches BC, and the lower curved liquid crystal alignment layer AL2C may include the alignment base layer AL2-1C, but no alignment stabilization layer AL2-2C.

Thus, in the fourth region R4, the content or average number of reactive mesogen projections per unit area of the upper curved liquid crystal alignment layer AL1C may be higher or greater than the content or average number of reactive mesogen projections per unit area of the lower curved liquid crystal alignment layer AL2C. In such an embodiment, in the fourth region R2, the content or average number of reactive mesogen projections per unit area of the lower curved liquid crystal alignment layer AL2C may be lower or less than the content or average number of reactive mesogen projections per unit area of the upper curved liquid crystal alignment layer AL1C.

Accordingly, in the fourth region R4, in the absence of an electric field in the curved LCD 500C, the liquid crystal molecules LC on the surface of the upper curved liquid crystal alignment layer AL1C may be aligned at the second pretilt angle $\theta_2$, and the liquid crystal molecules LC on the surface of the lower curved liquid crystal alignment layer AL2C may be aligned at the first pretilt angle $\theta_1$.

In the absence of an electric field in the curved LCD 500C, the liquid crystal molecules LC on the surface of the lower curved liquid crystal alignment layer AL2C are substantially vertically aligned, compared to the liquid crystal molecules on the surface of the upper curved liquid crystal alignment layer AL1C. Thus, the first pretilt angle $\theta_1$ may be larger than the second pretilt angle $\theta_2$. In one exemplary embodiment, for example, the pretilt angle (e.g., the first pretilt angle $\theta_1$) of the liquid crystal molecules LC on the surface of the lower curved liquid crystal alignment layer AL2C may be about 90°, and the pretilt angle (e.g., the second pretilt angle $\theta_2$) of the liquid crystal molecules LC on the surface of the upper curved liquid crystal alignment layer AL1C may be less than about 90°, e.g., in a range of about 88.6° to about 89.0°.

In the fifth region R5, the common electrode 110C may be disposed on the upper curved substrate 100C, the upper curved liquid crystal alignment layer AL1C may be disposed on the common electrode 110C, and the upper curved liquid crystal alignment layer AL1C may include the alignment base layer AL1-1C and the alignment stabilization layer AL1-2C. In the fifth region R5, the minute branches BC may be disposed on the lower curved substrate 200C, the lower curved liquid crystal alignment layer AL2C may be disposed on the minute branches BC, and the lower curved liquid crystal alignment layer AL2C may include the alignment base layer AL2-1C and the alignment stabilization layer AL2-2C.

In the fifth region R5, the liquid crystal molecules LC on the surface of each of the upper and lower curved liquid crystal alignment layers AL1C and AL2C may be obliquely aligned at the second pretilt angle $\theta_2$ in the absence of an electric field in the curved LCD 500C. In one exemplary embodiment, for example, the second pretilt angle $\theta_2$ may be less than about 90°, e.g., in a range of about 88.6° to about 89.0°.

The curved LCD 500C may include a region in which the content or average number of reactive mesogen projections per unit area of the upper curved liquid crystal alignment layer AL1C is lower or less than the content or average number of reactive mesogen projections per unit area of the lower curved liquid crystal alignment layer AL2C, e.g., the second region R2, and a region in which the content or average number of reactive mesogen projections per unit area of the upper curved liquid crystal alignment layer AL1C is higher or greater than the content or average number of reactive mesogen projections per unit area of the lower curved liquid crystal alignment layer AL2C, e.g., the fourth region R4.

The content or average number of reactive mesogen projections per unit area of the upper curved liquid crystal alignment layer AL1C may be lower or less in the second region R2 than in the fourth region R4.

Thus, such an embodiment of the curved LCD 500C may include a region in which the average surface roughness of the upper curved liquid crystal alignment layer AL1C is lower than the average surface roughness of the lower curved liquid crystal alignment layer AL2C, e.g., the second region R2, and a region in which the average surface roughness of the upper curved liquid crystal alignment layer AL1C is higher than the average surface roughness of the lower curved liquid crystal alignment layer AL2C, e.g., the fourth region R4.

In such an embodiment, the content or average number of reactive mesogen projections per unit area of the lower curved liquid crystal alignment layer AL2C may be higher or greater in the second region R2 than in the fourth region R4, and the average surface roughness of the lower curved liquid crystal alignment layer AL2C may be higher in the second region R2 than in the fourth region R4.

IN such an embodiment, the curved LCD 500C may include a region in which the pretilt angle (e.g., the first pretilt angle $\theta_1$) of the liquid crystal molecules LC on the surface of the upper curved liquid crystal alignment layer AL1C is larger than the pretilt angle (e.g., the second pretilt angle $\theta_2$) of the liquid crystal molecules LC on the surface of the lower curved liquid crystal alignment layer AL2C, e.g., the second region R2, and a region in which the pretilt angle (e.g., the second pretilt angle $\theta_2$) of the liquid crystal molecules LC on the surface of the upper curved liquid crystal alignment layer AL1C is smaller than the pretilt angle (e.g., the first pretilt angle $\theta_1$) of the liquid crystal molecules LC on the surface of the lower curved liquid crystal alignment layer AL2C, e.g., the fourth region R4.

In such an embodiment, the pretilt angle (e.g., the first pretilt angle $\theta_1$) of the liquid crystal molecules LC on the surface of the upper curved liquid crystal alignment layer AL1C in the second region R2 may be larger than the pretilt angle (e.g., the second pretilt angle $\theta_2$) of the liquid crystal molecules LC on the surface of the upper curved liquid crystal alignment layer AL1C in the fourth region R4.

In such an embodiment, the pretilt angle (e.g., the pretilt angle $\theta_2$) of the liquid crystal molecules LC on the surface of the lower curved liquid crystal alignment layer AL2C in the second region R2 may be larger than the pretilt angle (e.g., the first pretilt angle $\theta_1$) of the liquid crystal molecules LC on the surface of the lower curved liquid crystal alignment layer AL2C in the fourth region R4.

The third region R3 may be disposed between the second region R2 and the fourth region R4. In the third region R3, the difference between the pretilt angle (e.g., the first pretilt angle $\theta_1$) of the liquid crystal molecules LC on the surface of the upper curved liquid crystal alignment layer AL1C and the pretilt angle (e.g., the first pretilt angle $\theta_1$) of the liquid crystal molecules LC on the surface of the lower curved liquid crystal alignment layer AL2C may be about zero (0).

In the second region R2, the difference between the pretilt angle (e.g., the first pretilt angle $\theta_1$) of the liquid crystal molecules LC on the surface of the upper curved liquid crystal alignment layer AL1C and the pretilt angle (e.g., the pretilt angle $\theta_2$) of the liquid crystal molecules LC on the surface of the lower curved liquid crystal alignment layer AL2C may not be about zero (0), and in the fourth region R4, the difference between the pretilt angle (e.g., the first pretilt angle $\theta_1$) of the liquid crystal molecules LC on the surface of the upper curved liquid crystal alignment layer AL1C and the pretilt angle (e.g., the second pretilt angle $\theta_2$) of the liquid crystal molecules LC on the surface of the lower curved liquid crystal alignment layer AL2C may not be about zero (0). Thus, the difference between the pretilt angle of the liquid crystal molecules LC on the surface of the upper curved liquid crystal alignment layer AL1C and the pretilt angle of the liquid crystal molecules LC on the surface of the lower curved liquid crystal alignment layer AL2C may be smaller in the third region R3 than in the second and fourth regions R2 and R4.

In the third region R3, the upper and lower curved liquid crystal alignment layers AL1C and AL2C may not include the alignment stabilization layers AL1-2C and AL2-2C, such that the upper and lower curved liquid crystal alignment layers AL1C and AL2C may not include reactive mesogen polymer projections. Thus, the content or average number of reactive mesogen polymer projections may be lower or smaller in the third region R3 than in the second region R2 and/or the fourth region R4.

As described above, in the third region R3, the upper and lower curved liquid crystal alignment layers AL1C and AL2C may not include reactive mesogen polymer projections. Thus, the average surface roughness of the lower curved liquid crystal alignment layer AL2C in the third region R3 may be lower than the average surface roughness of the lower curved liquid crystal alignment layer AL2C in the second region R2, and the average surface roughness of the upper curved liquid crystal alignment layer AL1C in the third region R3 may be lower than the average surface roughness of the upper curved liquid crystal alignment layer AL1C in the fourth region R4.

In an exemplary embodiment, the curved LCD 500C may have a curvature radius (R) of about 2000 millimeters (mm) to about 5000 mm, and at an initial state in which an electric field is yet to be applied to the curved LCD 500C, the difference between an average pretilt angle $m\theta_1$ and an average pretilt angle $m\theta_2$, i.e., $m\theta_1$-$m\theta_2$, may be less than about 1.5°. In such an embodiment, the generation of dark spots or smudges that may occur due to collisions between the liquid crystal molecules LC on the surface of the upper curved liquid crystal alignment layer AL1C and the liquid crystal molecules LC on the surface of the lower curved liquid crystal alignment layer AL2C may be effectively prevented or substantially minimized.

Figure 4:
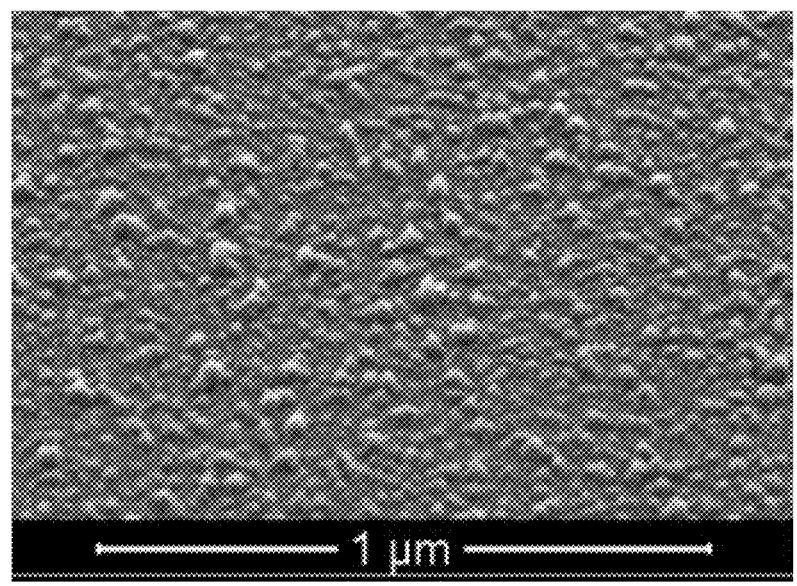
FIG. 4 is a photograph showing the surface of a lower curved liquid crystal alignment layer in a second region of FIG. 3.

FIG. 4 is a photograph showing the surface of the lower curved liquid crystal alignment layer AL2C in the second region R2 of FIG. 3.

Referring to FIG. 4, in an exemplary embodiment, the lower curved liquid crystal alignment layer AL2C may have a multilayer structure in which the alignment stabilization layer AL2-2C is disposed on the alignment base layer AL2-1C, and may include reactive mesogen polymer projections, which are densely distributed at intervals of a predetermined distance.

As described above, the reactive mesogen polymer projections may fix or stabilize the liquid crystal molecules on the surface of the lower curved liquid crystal alignment layer AL2C with the directors of the corresponding liquid crystal molecules LC in a relatively obliquely-aligned state, compared to the liquid crystal molecules LC on the surface of the upper curved liquid crystal alignment layer AL1C. Thus, the pretilt angle (e.g., the second pretilt angle $\theta_2$) of the liquid crystal molecules LC on the surface of the lower curved liquid crystal alignment layer AL2C may be smaller than the pretilt angle (e.g., the first pretilt angle $\theta_1$) of the liquid crystal molecules LC on the surface of the upper curved liquid crystal alignment layer AL1C.

Figure 5:
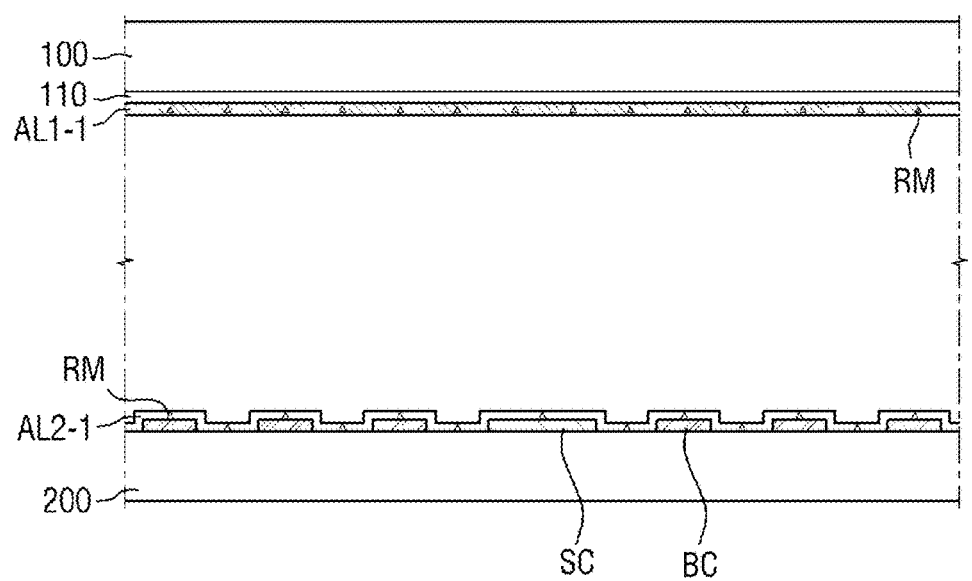
FIGS. 5 through 11 are schematic cross-sectional views illustrating a method of manufacturing a curved LCD, according to an exemplary embodiment of the invention.

FIGS. 5 to 11 are cross-sectional views illustrating a method of manufacturing the curved LCD 500C, according to an exemplary embodiment of the invention. An exemplary embodiment of the method of manufacturing the curved LCD 500C will hereinafter be described with reference to FIGS. 5 to 11. Referring to FIG. 5, a common electrode 110 and an upper alignment base layer AL1-1 may be sequentially provided or formed on an upper flat substrate 100, and a pixel electrode (SC and BC) and a lower alignment base layer AL2-1 may be sequentially provided or formed on a lower flat substrate 200. Then, the upper flat substrate 100 and the lower flat substrate 200 may be arranged to face each other with a predetermined cell gap maintained therebetween.

In one exemplary embodiment, for example, the lower flat substrate 200 may be a TFT substrate, and the upper flat substrate 100 may be a color filter substrate as a counter substrate of the second flat substrate 200.

The common electrode 110 may be provided or disposed on the upper flat substrate 100. The common electrode 110 may include or be formed of indium tin oxide ("ITO"), indium zinc oxide ("IZO"), indium oxide, zinc oxide, tin oxide, gallium oxide, titanium oxide, aluminum (Al), silver (Ag), platinum (Pt), chromium (Cr), molybdenum (Mo), tantalum (Ta), niobium (Nb), zinc (Zn), magnesium (Mg), or an alloy or a deposition layer thereof. As mentioned above, the common electrode 110 may be a "patternless" electrode with no slit patterns.

The upper alignment base layer AL1-1 may be disposed on the common electrode 110, and may be formed by applying a vertical alignment material including reactive mesogens RM onto the common electrode 110 and drying the vertical alignment material. The application of the vertical alignment material including reactive mesogens RM may be performed by inkjet printing, roll printing, or the like. The reactive mesogens RM may be a compound including a mesogen unit (for example, a biphenyl group) and polymerizable functional groups (for example, (meth) acrylate group) at one or both ends of the mesogen unit.

The pixel electrode (SC and BC) may be provided or disposed on the lower flat substrate 200. The pixel electrode (SC and BC) may include or be formed of ITO, IZO, indium oxide, zinc oxide, tin oxide, gallium oxide, titanium oxide, Al, Ag, Pt, Cr, Mo, Ta, Nb, Zn, Mg, or an alloy or a deposition layer thereof. As mentioned above, the pixel electrode (SC and BC) may be a pattern electrode with slit patterns including a cross-shaped stem SC, minute branches BC branched off from the cross-shaped stem SC, and cutouts DC disposed between the minute branches BC.

The lower alignment base layer AL2-1 may be disposed on the pixel electrode (SC and BC). The lower alignment base layer AL2-1 may be formed by applying a vertical alignment material including reactive mesogens RM onto the common electrode 110 and drying the vertical alignment material. The application of the vertical alignment material including reactive mesogens RM may be performed by inkjet printing, roll printing, or the like. The reactive mesogens RM may be a compound including a mesogen unit (for example, a biphenyl group) and polymerizable functional groups (for example, (meth)acrylate group) at one or both ends of the mesogen unit.

Figure 6:
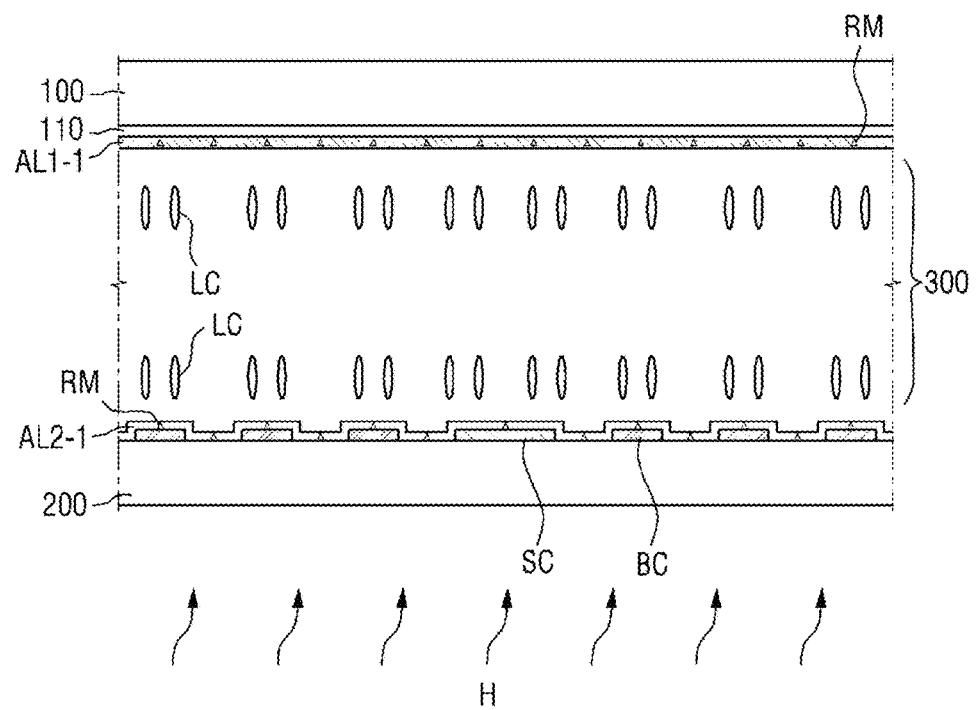

Referring to FIG. 6, a liquid crystal layer 300 may be provided or formed by injecting or dropping a liquid crystal composition between the upper and lower flat substrates 100 and 200, e.g., between the upper and lower alignment base layers AL1-1 and AL2-1.

Liquid crystal molecules LC may have negative dielectric anisotropy, and may be substantially vertically aligned with respect to the upper and lower flat substrates 100 and 200 at an initial state in which an electric field is yet to be applied to a flat panel liquid crystal panel including the upper and lower flat substrates 100 and 200 and the liquid crystal layer 300. In response to heat H being applied to the flat liquid crystal panel after the formation of the liquid crystal layer 300, the reactive mesogens RM in the upper and lower alignment base layers AL1-1 and AL2-1 may be eluted into the liquid crystal layer 300, as illustrated in FIG. 7.

Figure 7:
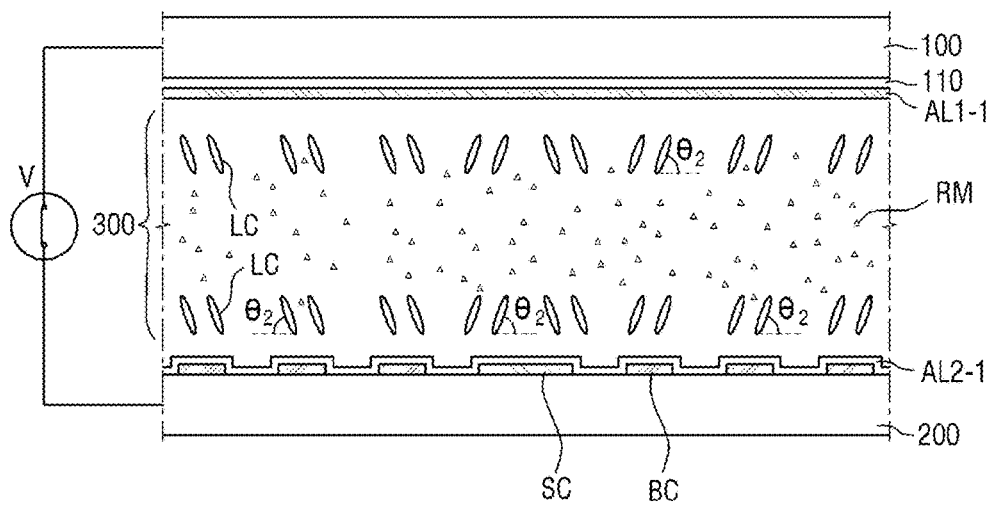

Referring to FIG. 7, in response to an electric field being applied to the flat liquid crystal panel, the liquid crystal molecules LC may be obliquely aligned at a predetermined pretilt angle, e.g., the second pretilt angle $\theta_2$, in a direction perpendicular to an electric field formed between the common electrode 110 and the pixel electrode (SC and BC).

Figure 8:
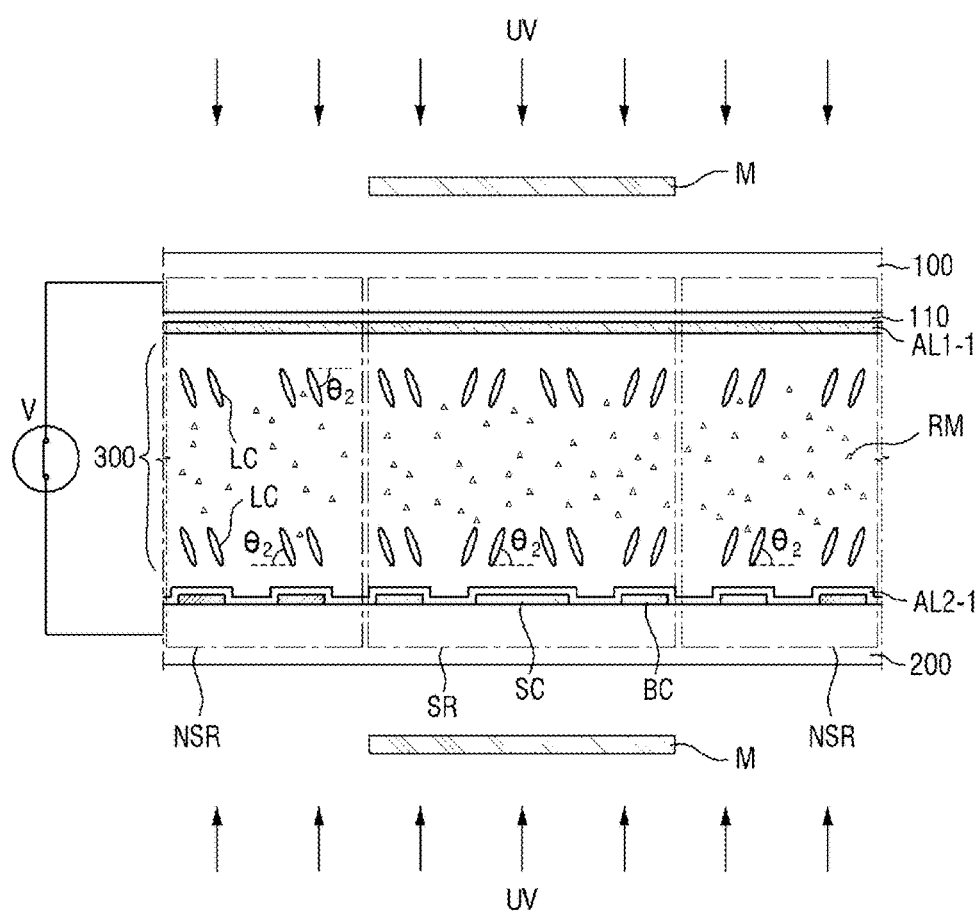

Referring to FIG. 8, masks M may be respectively disposed or placed above and below the flat liquid crystal panel to completely cover a predetermined area including the cross-shaped stem SC and the minute branches BC. Then, a voltage is applied, and ultraviolet ("UV") light is irradiated, thereby polymerizing the reactive mesogens RM in the liquid crystal layer 300.

Figure 9:
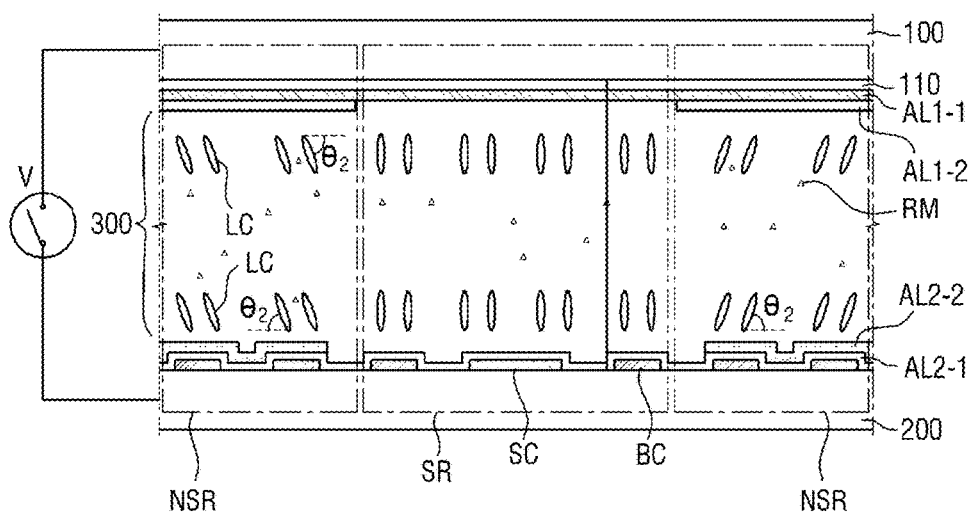

Referring to FIG. 9, in a light-blocked area SR blocked by the masks M from UV light, the liquid crystal molecules LC may be aligned vertically with respect to the upper and lower flat substrates 100 and 200 when a voltage is yet to be applied, but in a non-light-blocked area NSR, the liquid crystal molecules LC may be obliquely aligned, while maintaining the predetermined pretilt angle $\theta_2$ with the upper and lower flat substrates 100 and 200, even when a voltage is yet to be applied.

In the light-blocked area SR, the alignment stabilization layers AL1-2 and AL2-2 are not provided on the upper and lower alignment base layers AL1-1 and AL2-1, respectively, and in the non-light-blocked area NSR, the alignment stabilization layers AL1-2 and AL2-2 are provided on the upper and lower alignment base layers AL1-1 and AL2-1, respectively. The alignment stabilization layers AL1-2 and AL2-2 may include reactive mesogen polymer projections, and the reactive mesogen polymer projections may stabilize or fix the pretilt angle (e.g., the second pretilt angle $\theta_2$) of the liquid crystal molecules LC to pretilt the liquid crystal molecules LC at a predetermined angle.

As the formation of the alignment stabilization layers AL1-2 and AL2-2 is continued, the content of reactive mesogens RM in the liquid crystal layer 300 may gradually decrease, as the reactive mesogens RM lost from the liquid crystal layer 300 are used to form the alignment stabilization layers AL1-2 and AL2-2.

Figure 10:
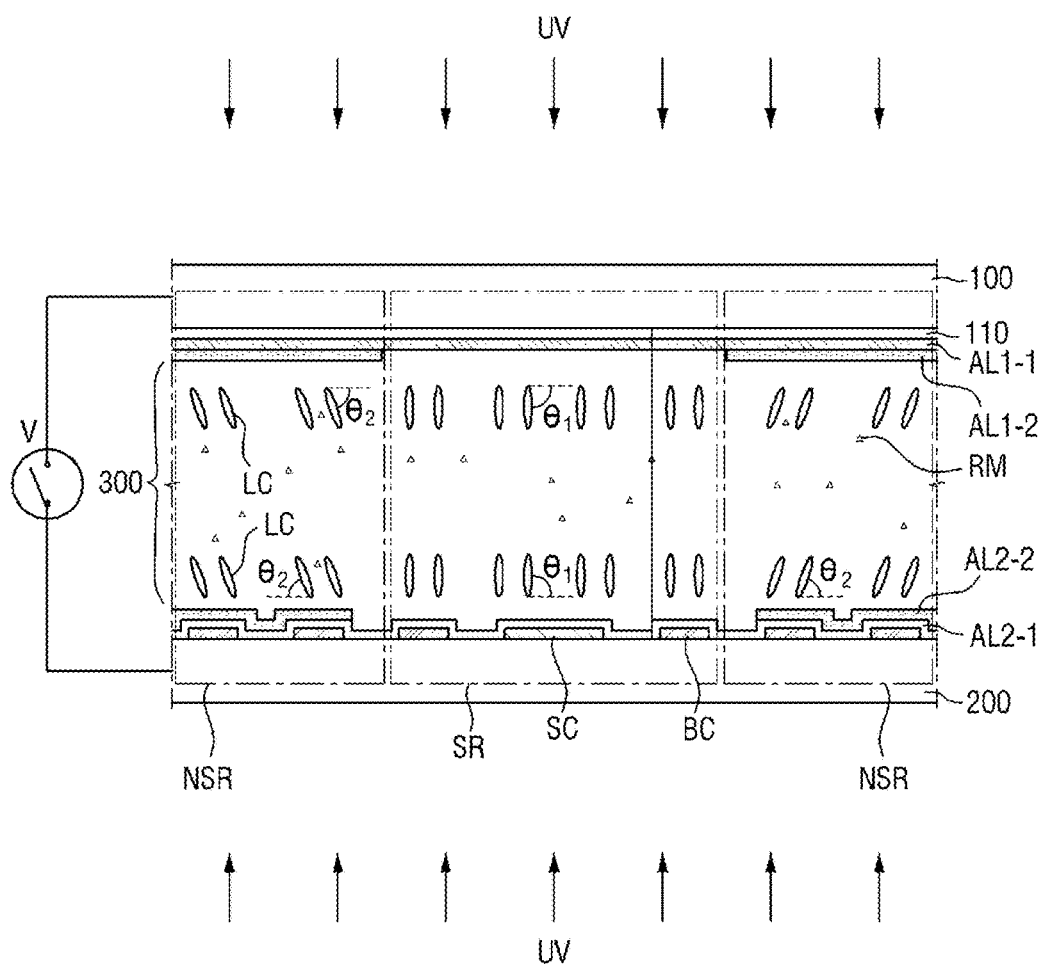
Figure 11:
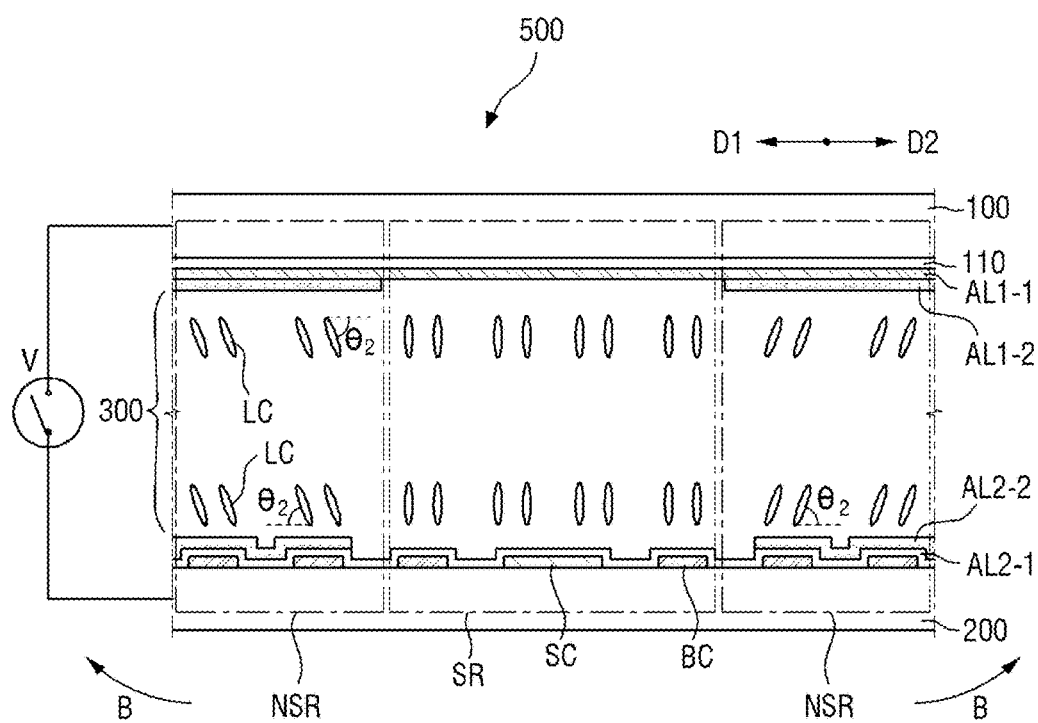

Referring to FIGS. 10 and 11, fluorescent UV light may be irradiated to the flat liquid crystal panel while applying no voltage, thereby removing the remaining reactive mesogens RM in the liquid crystal layer 300. Thereafter, a bending process B of bending a flat liquid crystal panel 500 at both ends of the flat liquid crystal panel 500 may be performed, thereby obtaining the curved LCD 500C of FIG. 3. During the bending process B of FIG. 11, the upper flat substrate 100 may be moved in, for example, a first direction D1, and the lower flat substrate 200 may be moved in, for example, a second direction D2 opposite to the first direction.

Figure 12A:
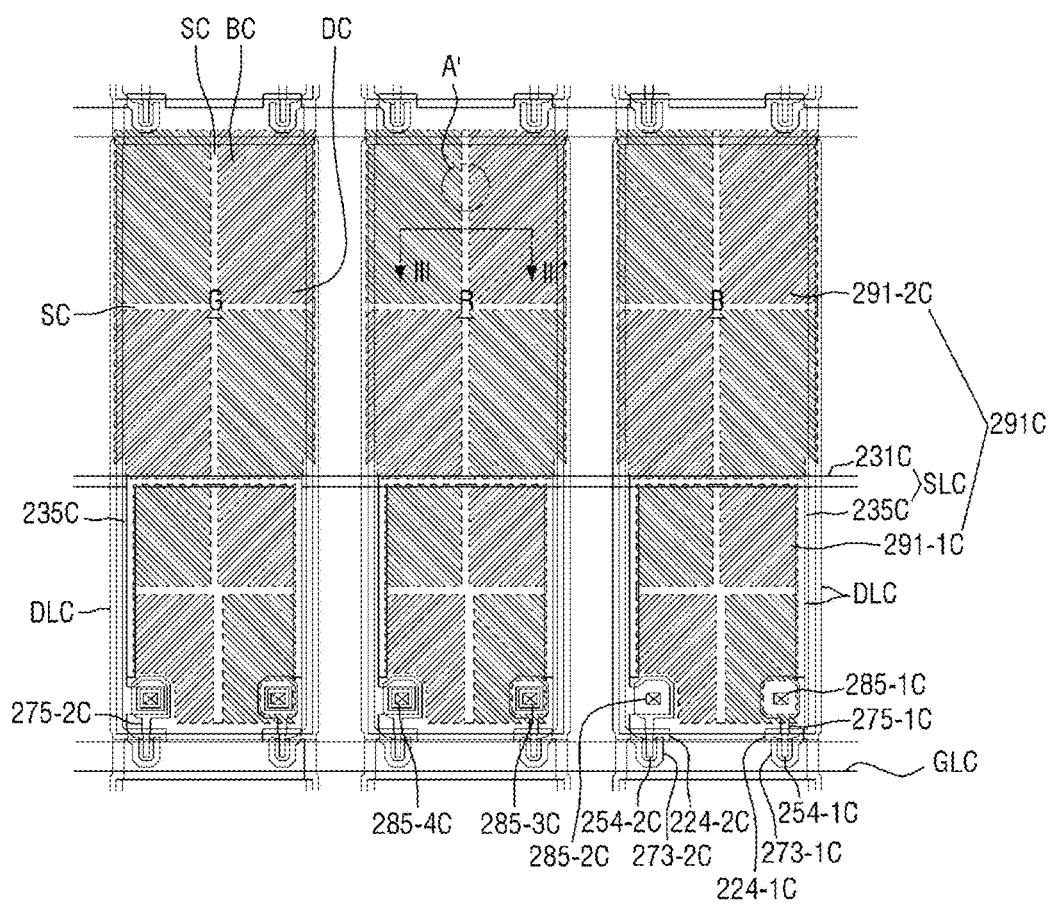
FIG. 12A is a schematic view of pixel electrodes of a curved LCD according to another exemplary embodiment of the invention.
Figure 12B:
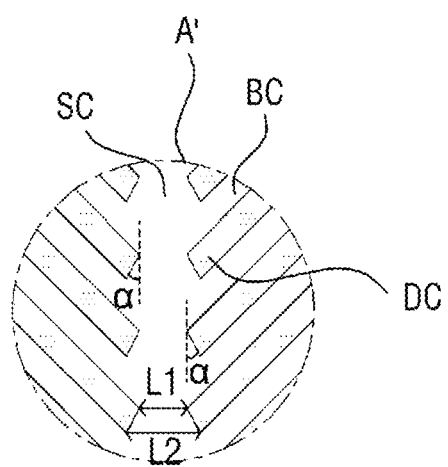
FIG. 12B is an enlarged view of the encircled portion A' in FIG. 12A.

FIG. 12A is a schematic view of pixel electrodes 291C of a curved LCD according to another exemplary embodiment of the invention. FIG. 12B is an enlarged view of the encircled portion A' of FIG. 12A.

The pixel electrodes 291C of FIGS. 12A and 12B will hereinafter be described, focusing mainly on differences with the pixel electrodes 291C of FIGS. 2A and 2B.

In an exemplary embodiment, as shown in FIG. 2B, opposing surfaces of each of a plurality of pairs of cutouts DC on opposite sides of a vertical stem portion of a pixel electrode 291C may be substantially parallel to each other in a vertical direction. In an alternative exemplary embodiment, as shown in FIG. 12B, opposing surfaces of each of a plurality of pairs of cutouts DC on opposite sides of a vertical stem portion of a pixel electrode 291C may not be parallel to each other in a vertical direction.

In such an embodiment, as shown in FIG. 12B, each of the pairs of cutouts DC may be disposed on the opposite sides of the vertical stem portion with a first gap L1 and a second gap L2, which is larger than the first gap L1, therebetween, and the opposing surfaces of each of the pairs of cutouts DC may be tilted at a predetermined angle α with respect to a vertical imaginary line, that is, dotted lines shown in FIG. 12B in parallel to the vertical direction.

The vertical stem portion may be tilted at the predetermined angle α with respect to the vertical imaginary line in areas where the cutouts DC are defined, and as a result, a horizontal field between the minute branches BC and the vertical stem portion may change. Thus, the pixel electrode 291C of FIGS. 12A and 12B may improve the control over the direction of liquid crystal molecules LC in the vertical stem portion, compared to the pixel electrode 291C of FIGS. 2A and 2B.

Figure 13:
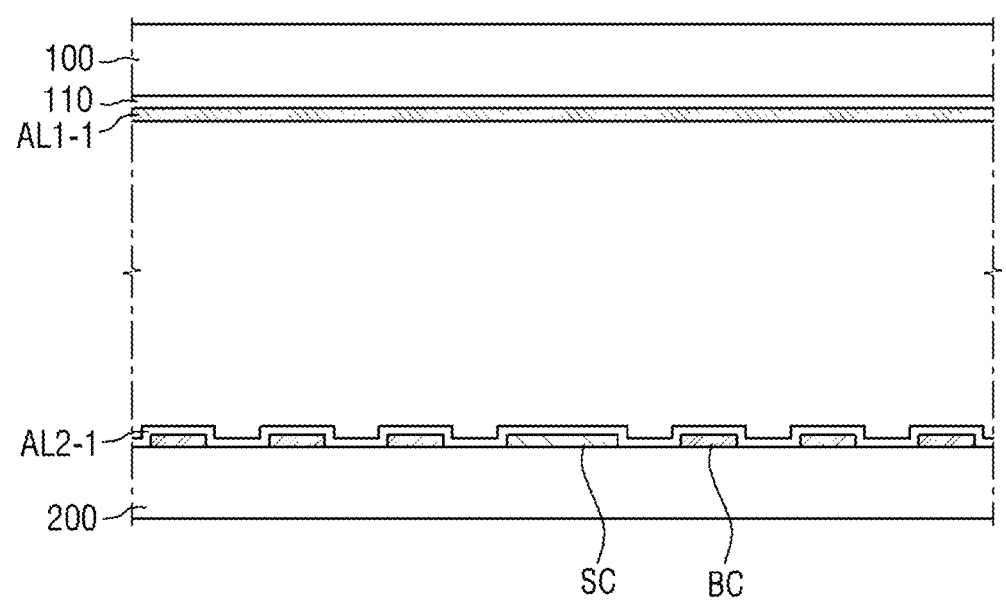
FIGS. 13 and 14 are schematic cross-sectional views illustrating methods of manufacturing a curved LCD, according to exemplary embodiments of the invention.
Figure 14:
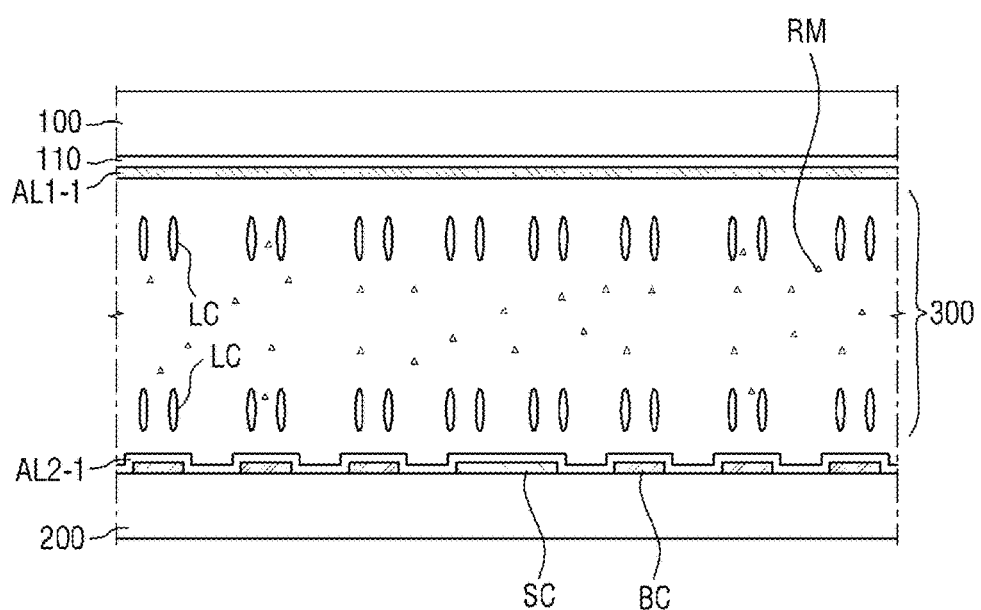

FIGS. 13 and 14 are schematic cross-sectional views illustrating a method of manufacturing a curved LCD, according to another exemplary embodiment of the invention.

A process illustrated in FIG. 13 differs from a process illustrated FIG. 5 in that upper and lower alignment base layers AL1 and AL2 do not contain reactive mesogens RM. A process illustrated in FIG. 14 differs from a process illustrated in FIG. 6 in that a liquid crystal composition comprising reactive mesogens RM is injected or dropped between upper and lower flat substrates 100 and 200.

The exemplary embodiment shown in FIGS. 13 and 14 differs from the exemplary embodiment described above with reference to FIGS. 5 to 11 in that reactive mesogens RM are added not to alignment layers, but to a liquid crystal composition or in that the liquid crystal composition is injected or dropped between the upper and lower flat substrates 100 and 200 along with liquid crystal molecules. Other processes of the method according to the exemplary embodiment of FIGS. 13 and 14 may be the same as corresponding processes of FIGS. 7 to 11, and any repetitive detailed description or illustration thereof will be omitted.

Figure 15:
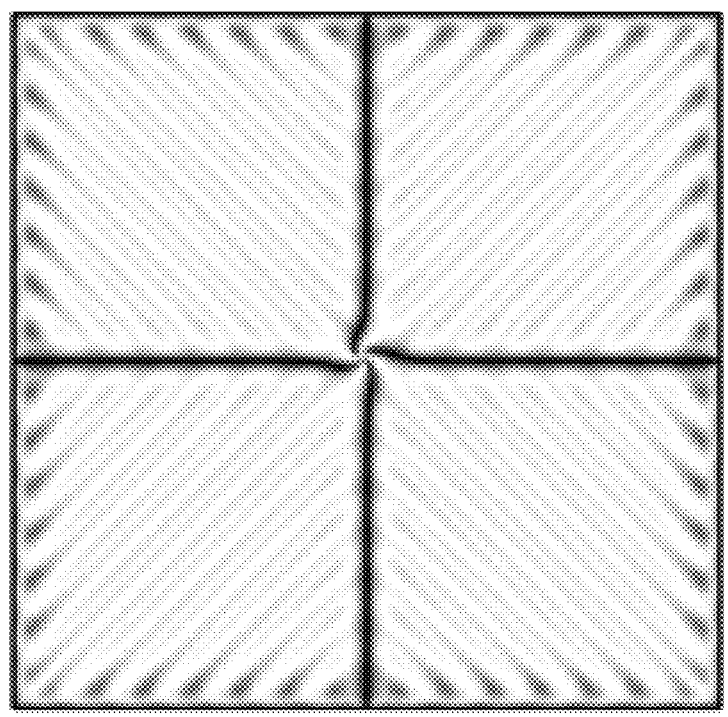
FIG. 15 is a photograph showing the optical transmittance of a flat liquid crystal panel.

FIG. 15 is a photograph showing the optical transmittance of a flat liquid crystal panel. FIG. 15 is a photograph showing the optical transmittance of a flat liquid crystal panel obtained by an exemplary embodiment of the method described above with reference to FIGS. 5 to 11 except for processes illustrated in FIGS. 8 and 11. More specifically, FIG. 15 is a photograph showing the optical transmittance of a flat liquid crystal panel obtained by applying reactive mesogens and a vertical alignment material onto upper and lower flat substrates, respectively, drying the reactive mesogens and the vertical alignment material, forming a liquid crystal layer, and irradiating UV light, while applying a voltage, to form upper and lower alignment layers each having both an alignment base layer and an alignment stabilization layer.

Referring to FIG. 15, the flat liquid crystal panel was not subjected to a bending process for fabricating a curved LCD, and is free from misalignment between the upper and lower flat substrates. Thus, no texture is detected from a cross-shaped stem.

Figure 16:
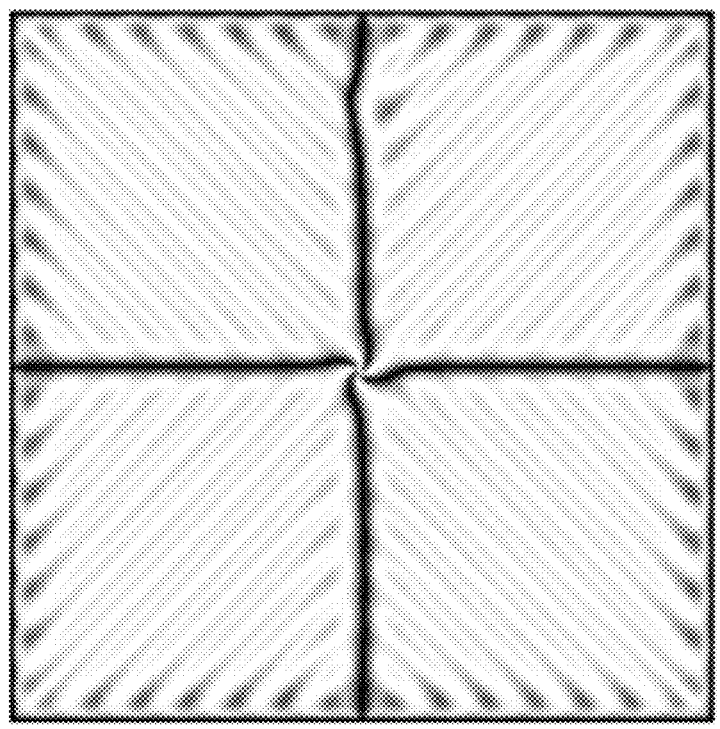
FIGS. 16 through 18 are photographs showing the optical transmittance of curved LCDs according to exemplary embodiments of the invention.
Figure 17:
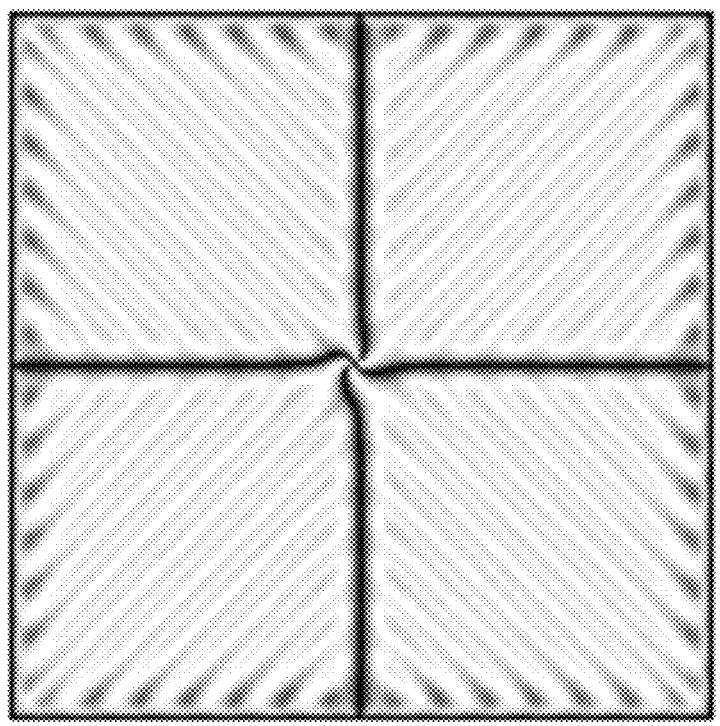
Figure 18:
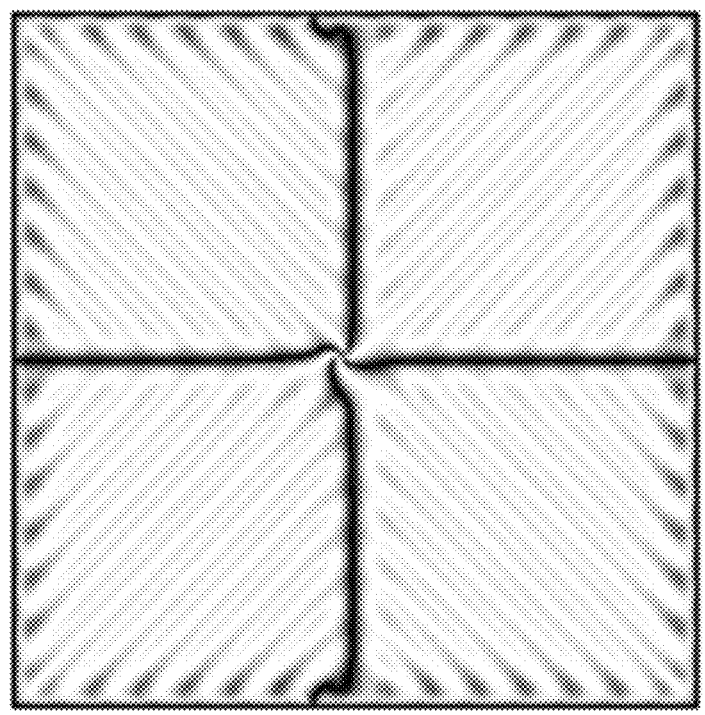

FIGS. 16 through 18 are photographs showing the optical transmittance of curved LCDs according to exemplary embodiments of the invention. More specifically, FIGS. 16 through 18 are photographs showing the optical transmittance of curved LCDs, which were fabricated by an exemplary embodiment of the method described above with reference to FIGS. 5 through 11 to have a pixel electrode as illustrated in FIG. 12. During the fabrication of each of the curved LCDs of FIGS. 16 to 18, a mask was placed over a flat liquid crystal panel, as illustrated in FIG. 8, to cover a 15 micrometer (μm)-wide range on both sides of a cross-shaped stem of each pixel electrode.

FIG. 16 shows the optical transmittance of a curved LCD with a misalignment error of about 10 μm between the upper and lower curved substrates thereof, FIG. 17 shows the optical transmittance of a curved LCD with an alignment error of 15 μm between the upper and lower curved substrates thereof, and FIG. 18 shows the optical transmittance of a curved LCD with an alignment error of about 15 μm between the upper and lower curved substrates thereof.

Referring to the curved LCDs of FIGS. 16 through 18, when an alignment error between upper and lower curved substrates occurs inside a light-blocked area, no texture may be viewed as a dark spot.

Figure 19:
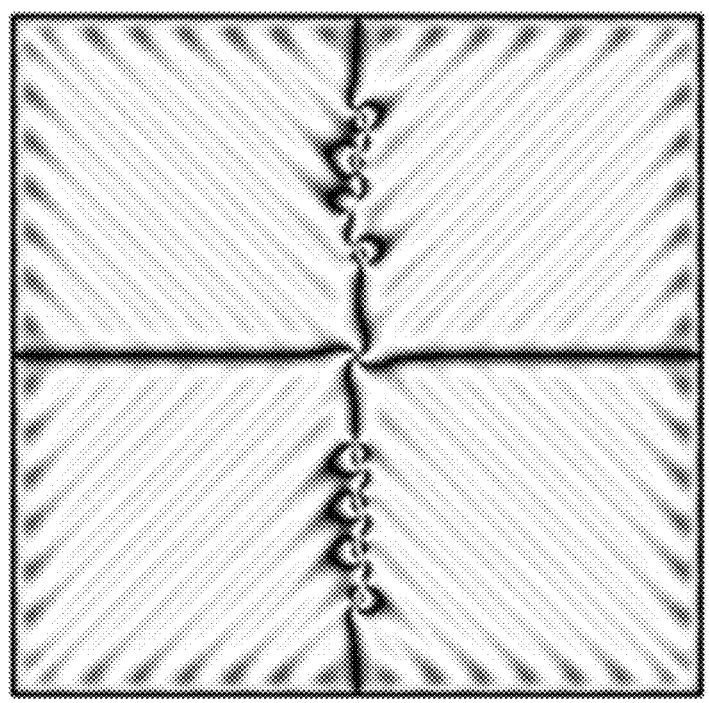
FIG. 19 is a photograph showing the optical transmittance of a curved LCD according to another exemplary embodiment of the invention.

FIG. 19 is a photograph showing the optical transmittance of a curved LCD according to another exemplary embodiment of the invention. More specifically, FIG. 19 is a photograph showing the optical transmittance of a curved LCD, which was fabricated by an exemplary embodiment of the method described above with reference to FIGS. 5 to 11 to have a pixel electrode as illustrated in FIG. 2. During the fabrication of the curved LCD of FIG. 19, a mask was placed over a flat liquid crystal panel, as illustrated in FIG. 8, to cover a 15 μm-wide range on both sides of a cross-shaped stem of each pixel electrode.

Referring to the curved LCD of FIG. 19, no texture is detected from near the cross-shaped stem, but dark spots are detected from along the cross-shaped stem due to failure to control the directivity of liquid crystal molecules in an area of the cross-shaped portion.

Figure 20:
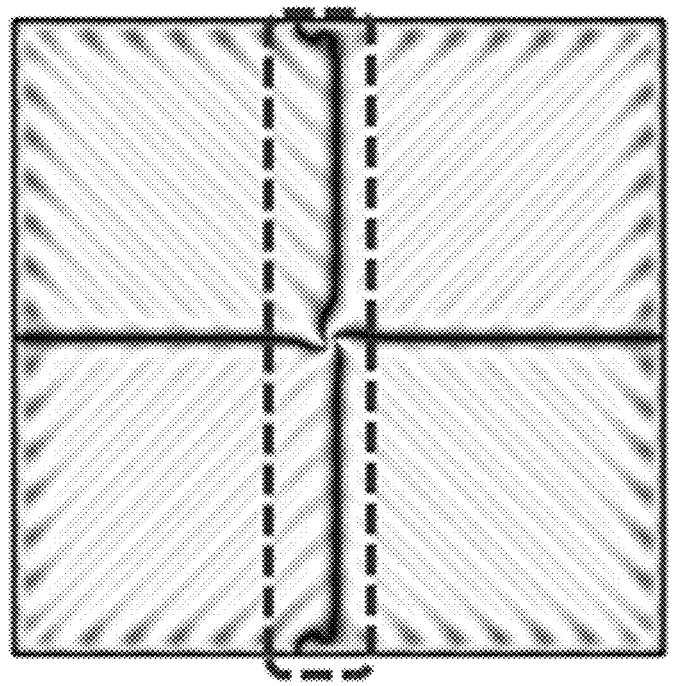
FIGS. 20 through 22 are photographs showing the optical transmittance of curved LCDs according to comparative examples.
Figure 21:
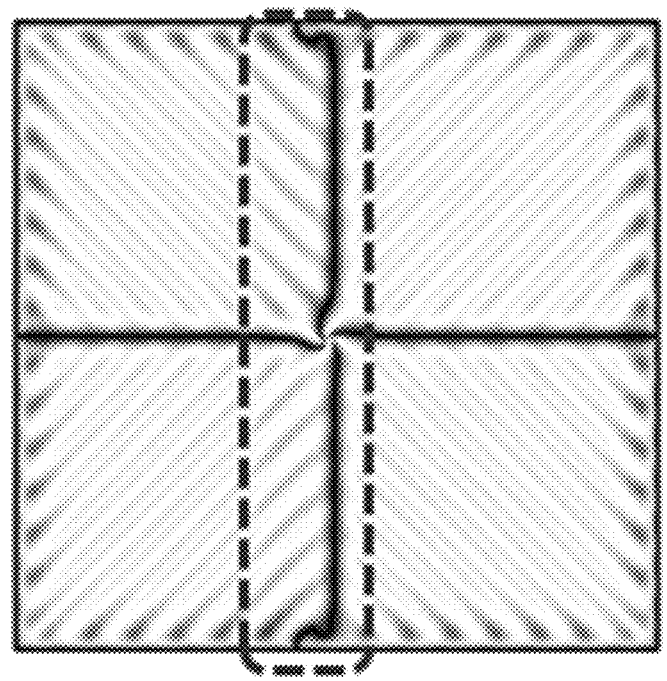
Figure 22:
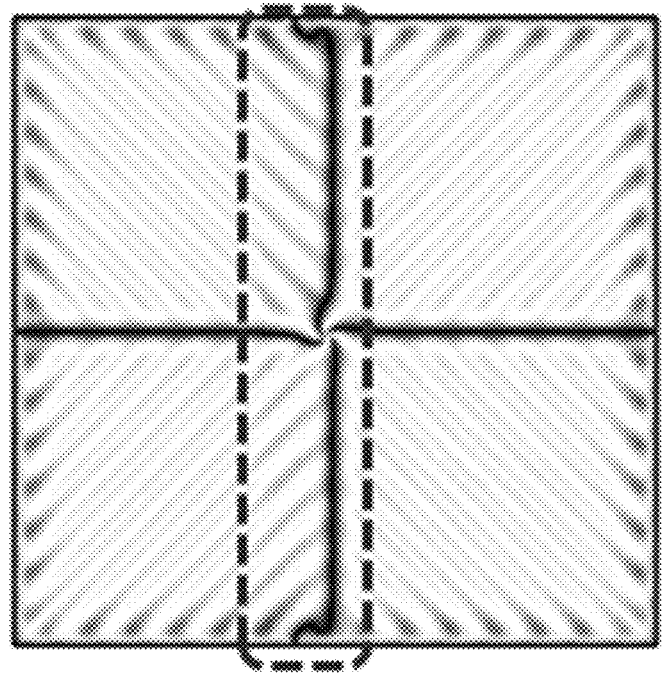

FIGS. 20 through 22 are photographs showing the optical transmittance of conventional curved LCDs according to comparative embodiments. More specifically, FIGS. 20 through 22 are photographs showing the optical transmittance of curved LCDs, which were each obtained by applying reactive mesogens and a vertical alignment material onto upper and lower flat substrates, respectively, drying the reactive mesogens and the vertical alignment material, forming a liquid crystal layer, and irradiating UV light, without performing the process of FIG. 8, to form upper and lower alignment layers each having both an alignment base layer and an alignment stabilization layer, and bending a resulting flat liquid crystal panel on both sides thereof, as illustrated in FIG. 11.

FIG. 20 shows the optical transmittance of a conventional curved LCD with a misalignment error of about 10 μm between the upper and lower curved substrates thereof, FIG. 21 shows the optical transmittance of a conventional curved LCD with an alignment error of about 15 μm between the upper and lower curved substrates thereof, and FIG. 22 shows the optical transmittance of a conventional curved LCD with an alignment error of about 15 μm between the upper and lower curved substrates thereof.

As shown in FIGS. 20 through 22, when an alignment error occurs between upper and lower curved substrates, texture may be viewed in a conventional LCD in an area near a cross-shaped stem, as indicated by dotted lines.

It will be apparent to those skilled in the art that various modifications and variation can be made in the described embodiments. The described embodiments cover modifications and variations within the scope defined by the appended claims and their equivalents.

What is claimed is:

1. A curved liquid crystal display, comprising:
an upper curved substrate;
a lower curved substrate disposed opposite to the upper curved substrate;
a liquid crystal layer disposed between the upper and lower curved substrates, wherein the liquid crystal layer comprises liquid crystal molecules having negative dielectric anisotropy;
an upper curved liquid crystal alignment layer disposed between the liquid crystal layer and the upper curved substrate; and
a lower curved liquid crystal alignment layer disposed between the liquid crystal layer and the lower curved substrate,
wherein
a content of a reactive mesogen polymer per unit area of the lower curved liquid crystal alignment layer in a first region is higher than a content of the reactive mesogen polymer per unit area of the upper curved liquid crystal alignment layer in the first region, and
the content of the reactive mesogen polymer per unit area of the upper curved liquid crystal alignment layer in a second region is higher than the content of the reactive mesogen polymer per unit area of the lower curved liquid crystal alignment layer in the second region.

2. The curved liquid crystal display of claim 1, wherein the content of the reactive mesogen polymer per unit area of the lower curved liquid crystal alignment layer is higher in the first region than in the second region.

3. The curved liquid crystal display of claim 1, wherein the content of the reactive mesogen polymer per unit area of the upper curved liquid crystal alignment layer is lower in the first region than in the second region.

4. The curved liquid crystal display of claim 1, wherein
a third region is defined between the first and second regions, and
a difference between the content of the reactive mesogen polymer per unit area of the upper curved liquid crystal alignment layer and the content of the reactive mesogen polymer per unit area of the lower curved liquid crystal alignment layer is smaller in the third region than in the first region or the second region.

5. The curved liquid crystal display of claim 1, wherein
a pretilt angle of first liquid crystal molecules on a surface of the lower curved liquid crystal alignment layer in the first region at an initial state is smaller than a pretilt angle of second liquid crystal molecules on a surface of the upper curved liquid crystal alignment layer in the first region at the initial state,
a pretilt angle of third liquid crystal molecules on a surface of the upper curved liquid crystal alignment layer in the second region at the initial state is smaller than a pretilt angle of fourth liquid crystal molecules on a surface of the lower curved liquid crystal alignment layer in the second region at the initial state, and
the initial state is a state in which no electric field is applied to the liquid crystal molecules.

6. The curved liquid crystal display of claim 5, wherein the pretilt angle of the first liquid crystal molecules is smaller than the pretilt angle of the third liquid crystal molecules.

7. The curved liquid crystal display of claim 5, wherein the pretilt angle of the second liquid crystal molecules is larger than the pretilt angle of the fourth liquid crystal molecules.

8. The curved liquid crystal display of claim 5, wherein
a third region is defined between the first and second regions,
wherein a difference between a pretilt angle of fifth liquid crystal molecules on the surface of the upper curved liquid crystal alignment layer in the third region at the initial state and a pretilt angle of sixth liquid crystal molecules on the surface of the lower curved liquid crystal alignment layer in the third region in the initial state is smaller than a difference between the pretilt angle of the first liquid crystal molecules and the pretilt angle of the second liquid crystal molecules or a difference between the pretilt angle of the third liquid crystal molecules and the pretilt angle of the fourth liquid crystal molecules.

9. The curved liquid crystal display of claim 1, wherein in the first region, the lower curved liquid crystal alignment layer has a higher average surface roughness than the upper curved liquid crystal alignment layer.

10. The curved liquid crystal display of claim 1, wherein in the second region, the upper curved liquid crystal alignment layer has a higher average surface roughness than the lower curved liquid crystal alignment layer.

11. The curved liquid crystal display of claim 1, wherein the average surface roughness of the lower curved liquid crystal alignment layer is higher in the first region than in the second region.

12. The curved liquid crystal display of claim 1, wherein the average surface roughness of the upper curved liquid crystal alignment layer is lower in the first region than in the second region.

13. The curved liquid crystal display of claim 1, further comprising:
a patternless common electrode disposed between the upper curved substrate and the upper curved liquid crystal alignment layer, wherein no cutout is defined in the patternless common electrode; and
a pixel electrode disposed between the lower curved liquid crystal alignment layer and the lower curved substrate, wherein slit patterns are defined in the pixel electrode, and
the slit patterns comprises a cross-shaped stem, minute branches branched off from the cross-shaped stem, and cutouts disposed between the minute branches.

14. The curved liquid crystal display of claim 13, wherein
the cross-shaped stem comprises a horizontal stem portion and a vertical stem portion, which intersects the horizontal stem portion, and
opposing sides of each pair of cutouts on opposite sides of the horizontal stem portion and/or the vertical stem portion are not parallel to each other.

15. A curved liquid crystal display, comprising:
an upper curved substrate;
a lower curved substrate disposed opposite to the upper curved substrate;
a liquid crystal layer disposed between the upper and lower curved substrates, wherein the liquid crystal layer comprises liquid crystal molecules having negative dielectric anisotropy;
an upper curved liquid crystal alignment layer disposed between the liquid crystal layer and the upper curved substrate; and a lower curved liquid crystal alignment layer disposed between the liquid crystal layer and the lower curved substrate, wherein a pretilt angle of first liquid crystal molecules on a surface of the lower curved liquid crystal alignment layer in a first region at an initial state is smaller than a pretilt angle of second liquid crystal molecules on a surface of the upper curved liquid crystal alignment layer in the first region at the initial state, a pretilt angle of third liquid crystal molecules on a surface of the upper curved liquid crystal alignment layer in a second region at the initial state is smaller than a pretilt angle of fourth liquid crystal molecules on a surface of the lower curved liquid crystal alignment layer in the second region at the initial state, the initial state is a state in which no electric field is applied to the liquid crystal molecules, the second liquid crystal molecules are aligned more vertically than the first liquid crystal molecules, and the fourth liquid crystal molecules are aligned more vertically than the third liquid crystal molecules.

16. The curved liquid crystal display of claim 15, wherein the pretilt angle of the first liquid crystal molecules is smaller than the pretilt angle of the third liquid crystal molecules.

17. The curved liquid crystal display of claim 15, wherein the pretilt angle of the second liquid crystal molecules is larger than the pretilt angle of the fourth liquid crystal molecules.

18. The curved liquid crystal display of claim 15, wherein a third region is defined between the first and second regions, wherein a difference between a pretilt angle of fifth liquid crystal molecules on the surface of the upper curved liquid crystal alignment layer in the third region at the initial state and a pretilt angle of sixth liquid crystal molecules on the surface of the lower curved liquid crystal alignment layer in the third region at the initial state is smaller than a difference between the pretilt angle of the first liquid crystal molecules and the pretilt angle of the second liquid crystal molecules or a difference between the pretilt angle of the third liquid crystal molecules and the pretilt angle of the fourth liquid crystal molecules.

\* \* \* \* \*